(12) United States Patent
Liao et al.

(10) Patent No.: US 10,787,590 B2
(45) Date of Patent: Sep. 29, 2020

(54) POLYMER AND COATING MATERIAL

(71) Applicant: INDUSTRIAL TECHNOLOGY RESEARCH INSTITUTE, Hsinchu (TW)

(72) Inventors: Kai-Wei Liao, Taoyuan (TW); Wei-Cheng Tang, Hsinchu (TW); Yi-Tzu Peng, Zhudong Township (TW); Ya-Tin Yu, New Taipei (TW); Yi-Che Su, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/232,302

(22) Filed: Dec. 26, 2018

(65) Prior Publication Data

US 2020/0208006 A1    Jul. 2, 2020

(51) Int. Cl.
  *C09D 163/00*    (2006.01)
  *C08L 63/00*    (2006.01)

(52) U.S. Cl.
  CPC ............ *C09D 163/00* (2013.01); *C08L 63/00* (2013.01)

(58) Field of Classification Search
  CPC .............................. C09D 163/00; C08L 63/00
  USPC ........................................................ 523/427
  See application file for complete search history.

(56) References Cited

U.S. PATENT DOCUMENTS

| | | | |
|---|---|---|---|
| 5,545,824 A | 8/1996 | Stengel et al. | |
| 5,962,608 A | 10/1999 | Ryang et al. | |
| 6,130,286 A | 10/2000 | Thomas et al. | |
| 6,472,493 B1 | 10/2002 | Huynh-Ba | |
| 8,168,721 B2 | 5/2012 | Marsh et al. | |
| 8,802,792 B2 | 8/2014 | Carlson et al. | |
| 9,334,355 B2 | 5/2016 | Taniguchi et al. | |
| 9,545,617 B2 | 1/2017 | Wu et al. | |
| 2012/0070594 A1 | 3/2012 | Carlson et al. | |
| 2016/0297990 A1 | 10/2016 | Pierre et al. | |

FOREIGN PATENT DOCUMENTS

| | | | | |
|---|---|---|---|---|
| CN | 106632946 A | | 5/2017 | |
| CN | 106752816 A | * | 5/2017 | ........... C09D 175/04 |
| DE | 279667 A1 | | 6/1990 | |
| EP | 0953613 A2 | | 11/1999 | |
| JP | 57-55969 A | | 4/1982 | |
| JP | 63-4595 B2 | | 1/1988 | |
| JP | 8-292571 A | | 11/1996 | |
| JP | 2000-63410 A | | 2/2000 | |
| JP | 3509277 B2 | | 3/2004 | |
| TW | I630954 B | | 8/2018 | |
| WO | WO 92/05225 A1 | | 4/1992 | |
| WO | WO 2008/013059 A1 | | 1/2008 | |
| WO | WO 2013/035787 A1 | | 3/2013 | |

OTHER PUBLICATIONS

Chen et al., CN 106752816 A machine translation in English, May 31, 2017 (Year: 2017).*

* cited by examiner

*Primary Examiner* — David T Karst
(74) *Attorney, Agent, or Firm* — Birch, Stewart, Kolasch & Birch, LLP

(57) ABSTRACT

A polymer is provided, which is formed by reacting a diol having hydrogenated bisphenol group with a bis-epoxy compound. The diol having hydrogenated bisphenol group may have a chemical structure of

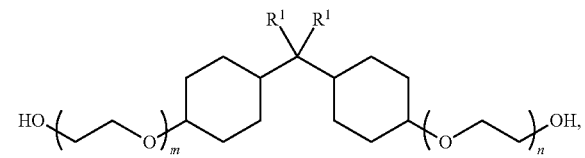

wherein each of $R^1$ is independently H or methyl, and m and n are independently integers of 1 to 4. The bis-epoxy compound can be

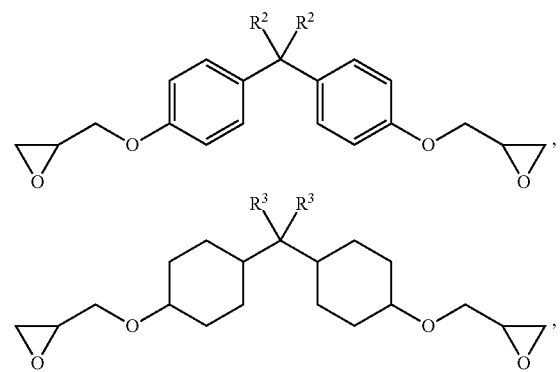

or a combination thereof, wherein each of $R^2$ is independently H or methyl, and each of $R^3$ is independently H or methyl.

11 Claims, No Drawings

POLYMER AND COATING MATERIAL

TECHNICAL FIELD

The technical field relates to a coating material, and in particular it relates to a polymer in the composition of the coating material.

BACKGROUND

Polyurethane is widely applied in automobiles, floor and wood industries, and decorating coating materials. As such, the requirements on polyurethane for brightness, climate resistance, and similar properties are high. There is a global need for a finish coating with a high brightness, wherein the brightness must be at least 90 for a light with an incident angle of 60°. The polyol resins for conventional polyurethane coatings are linear structures having inherently high crystallinity. The polyol resin will be in a semi-solid state or a solid state when its weight average molecular weight is greater than 1000 g/mol. As such, a large amount of solvent should be added to formulate the coating material to achieve the desired brightness, but the volatile organic compound (VOC) of the coating material is high. The commercially available finish coating materials of high brightness have a solid content of less than 55% and a VOC greater than 450 g/L, which cannot satisfy the requirements on finish coating materials (e.g. VOC less than 420 g/L) in Europe, America, China, and other jurisdictions. Accordingly, how to maintain high brightness when increasing the solid content (e.g. lower the VOC) of the finish coating material is the focus of related industries.

SUMMARY

One embodiment of the disclosure provides a polymer, formed by reacting a diol having a hydrogenated bisphenol group with a bis-epoxy compound.

One embodiment of the disclosure provides a polymer, having a chemical structure of:

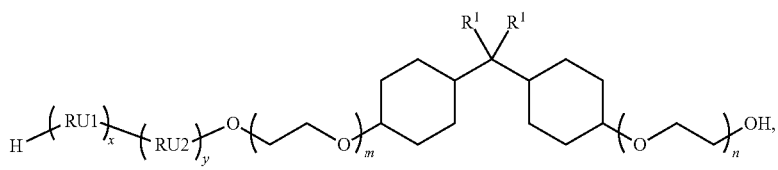

wherein RU1 has a chemical structure of

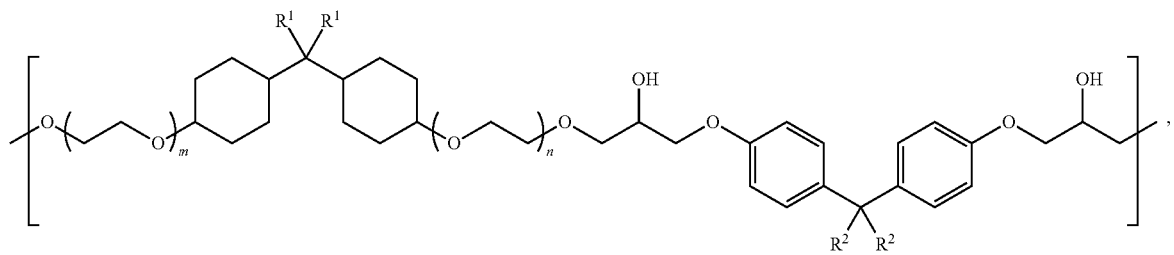

RU2 has a chemical structure of

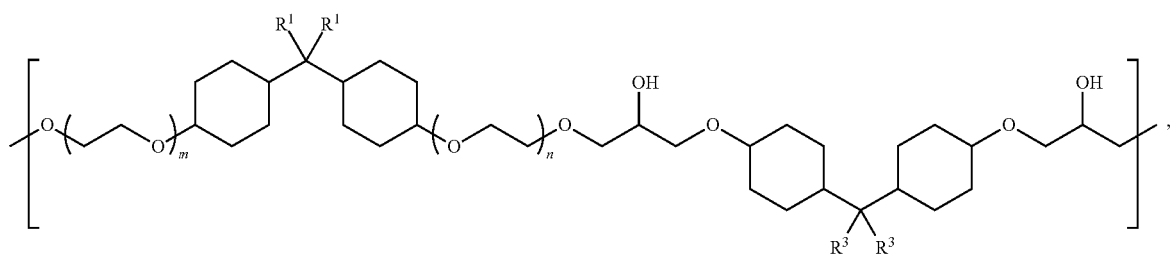

wherein each of R¹ is independently H or methyl, each of R² is independently H or methyl, each of R³ is independently H or methyl, m and n are independently integers of 1 to 4, x and y are independently integers of 0 to 9, and x+y≠0.

One embodiment of the disclosure provides a coating material, including: 100 parts by weight of polymer; 130 to 160 parts by weight of curing agent; and 25 to 70 parts by weight of solvent, wherein the polymer is formed by reacting a diol having hydrogenated bisphenol group with a bis-epoxy compound.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides a polymer, formed by reacting a diol having hydrogenated bisphenol group with a bis-epoxy compound. In some embodiments, the diol having hydrogenated bisphenol group has a chemical structure of:

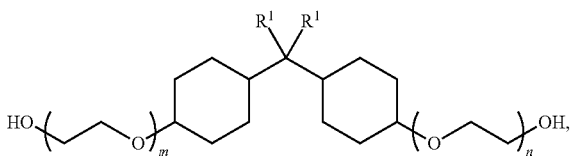

wherein each of R¹ is independently H or methyl, and m and n are independently integers of 1 to 4. The diol having hydrogenated bisphenol group can be formed by the method disclosed in Taiwan Patent No. 1630954. It should be understood that one skilled in the art may form the diol having hydrogenated bisphenol group by any suitable method, which is not limited to the method disclosed in Taiwan Patent No. 1630954.

In some embodiments, the bis-epoxy compound is

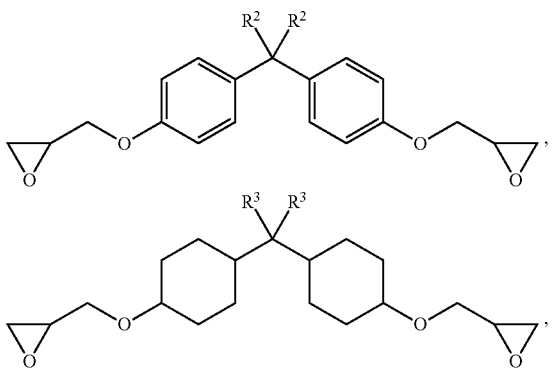

or a combination thereof, wherein each of R² is independently H or methyl, and each of R³ is independently H or methyl. The bis-epoxy compound can be commercially available product. In some embodiments, the diol having hydrogenated bisphenol group with a bis-epoxy compound have a molar ratio of 1:1 to 7:1. If the amount of bis-epoxy compound is too low, the polymer will have a molecular weight that is too low. If the amount of bis-epoxy compound is too high, the synthesis of the polymer will be easily gelled.

In some embodiments, the polymer has a weight average molecular weight (Mw) of 600 to 6500. If the weight average molecular weight of the polymer is too low, the coating film formed from the polymer and curing agent will have a poor compactness. If the weight average molecular weight of the polymer is too high, the viscosity of the polymer will be too high and it can easily exist in a solid state at normal temperatures. The polymer can be used in a coating material. The polymer and the curing agent can be respectively stored in practice. For example, the coating material base (including the polymer and the solvent) and the curing agent can respectively be stored for the benefit of long-term storage.

One embodiment of the disclosure provides a polymer having a chemical structure of

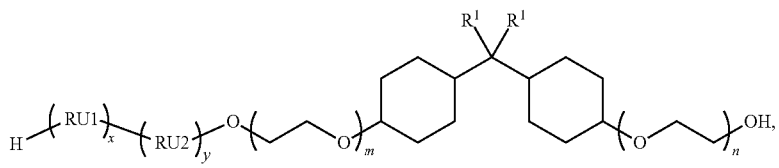

in which RU1 has a chemical structure of

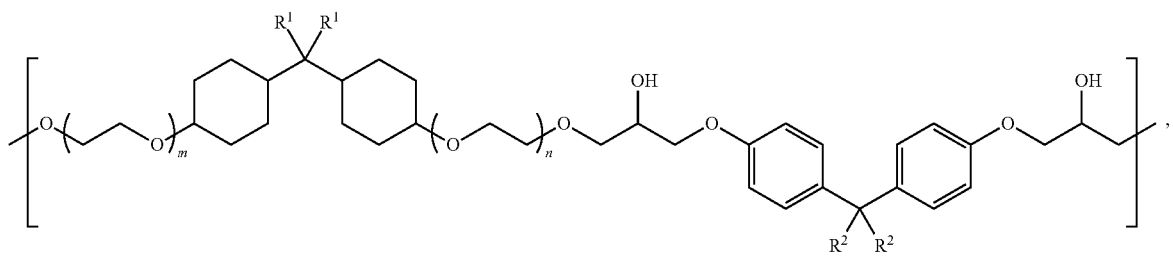

RU2 has a chemical structure of

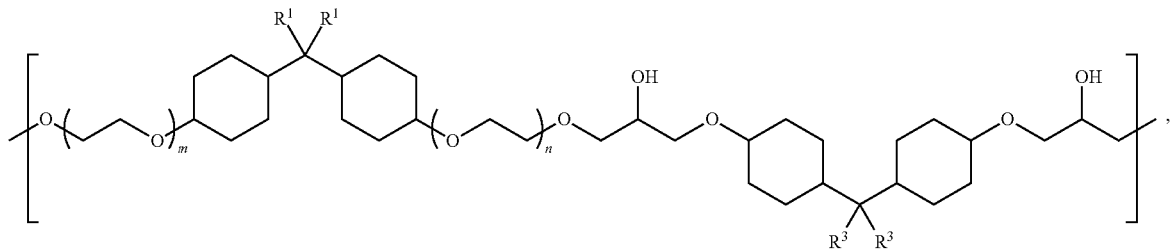

wherein each of $R^1$ is independently H or methyl, each of $R^2$ is independently H or methyl, each of $R^3$ is independently H or methyl, m and n are independently integers of 1 to 4, x and y are independently integers of 0 to 9, and x+y≠0. RU1 and RU2 can be alternately arranged or randomly arranged. In one embodiment, the chemical structure of RU1 comes from a polymerization of the diol having hydrogenated bisphenol group with a bis-epoxy compound having bisphenol group, and the chemical structure of RU2 comes from a polymerization of the diol having hydrogenated bisphenol group with a bis-epoxy compound having hydrogenated bisphenol group. For example, when the bis-epoxy compound is bisphenol epoxy resin monomer, the polymer may have a chemical structure of

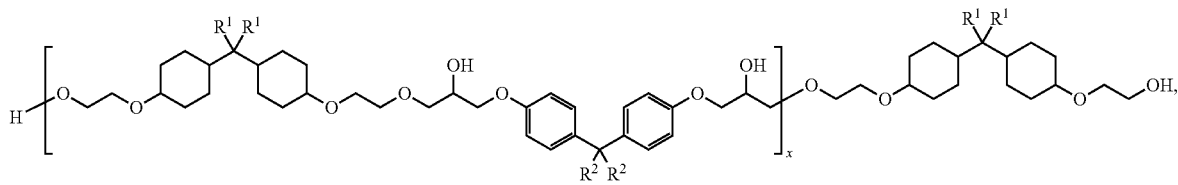

and the polymer may have a weight average molecular weight of 700 to 6500. A coating material base containing the polymer may have a solid content of 60% to 80%, and a viscosity of 90 cps to 3500 cps at 25° C. When the bis-epoxy compound is hydrogenated bisphenol epoxy resin monomer, the polymer may have a chemical structure of

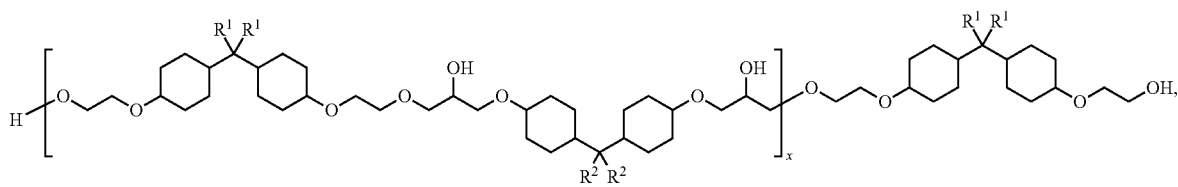

and the polymer may have a weight average molecular weight of 600 to 2000. A coating material base containing the polymer may have a solid content of 60% to 80%, and a viscosity of 80 cps to 2500 cps at 25° C. When the bis-epoxy compound is a combination of the bisphenol epoxy resin monomer and the hydrogenated bisphenol epoxy resin monomer, the polymer may have a chemical structure of

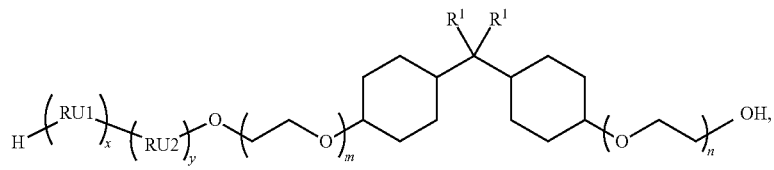

the definitions of RU1 and RU2 are similar to those described above, and the ratio of x and y is the molar ratio of the bisphenol epoxy resin monomer and the hydrogenated bisphenol epoxy resin monomer.

One embodiment of the disclosure provides a coating material including 100 parts by weight of the polymer, 130 to 160 parts by weight of curing agent, and 25 to 70 parts by weight of solvent. The chemical structure and the formation of the polymer are similar to those described above, and the related description is not repeated here. If the amount of curing agent is too low, the coating film cannot be completely formed. If the amount of curing agent is too high, the polymer will over-crosslink with the curing agent, thereby degrading the physical properties of the coating film and the adhesion between the substrate and the coating film. If the amount of solvent is too low, the viscosity of the coating material will be too high to process the coating process due to the lower leveling degree. If the amount of solvent is too high, the solid content of the coating material will decrease and VOC of the coating material will increase.

In one embodiment, the curing agent may have a plurality of isocyanate groups, such as a multi-isocyanate compound. In one embodiment, the solvent can be xylene, n-butyl acetate, another suitable solvent, or a combination thereof. In general, the solvent may have a boiling point of 120° C. to 140° C. A solvent with a boiling point that is too high may make it difficult for the coating material to form a coating layer via drying after being coated. The coating material may have a solid content of 60% to 80%, and the coating film formed from the coating material has brightness greater than 90 (measured by the standard ASTM D523 or CNS 10756-1). The polymer and the curing agent can be respectively stored in practice. For example, the coating material base (including the polymer and the solvent) and the curing agent can respectively be stored for the benefit of long-term storage.

In the embodiments of the disclosure, the diol having hydrogenated bisphenol group and the bis-epoxy compound are copolymerized to extend the chain at high temperature to form the polymer. The polymer in the embodiments is different from a conventional polyol whose main structure is a linear structure or benzene. For example, the polymer in the embodiments has a large amount of ethoxy soft segments and an aliphatic ring structure, so that the polymer molecules are not easily arranged or crystallized in a single orientation, thereby increasing the intermolecular free volume to enhance the flowability and reduce the viscosity of the polymer. As a result, the polymer is a flowable liquid with high molecular weight. The polymer can be used to formulate a coating material of high molecular weight, low viscosity, high solid content, and low VOC, and satisfy the requirements (e.g. high brightness) of the coating film.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Example 1

51.18 g of diol having hydrogenated bisphenol group (hereinafter abbreviated as HBPA2, synthesized by the method disclosed in Taiwan Patent No. 1630954) and 0.40 g of boron trifluoride monoethylamine complex (hereinafter abbreviated as BF3-MEA, commercially available from Tokyo Chemical Industry Co., Ltd.) were mixed, and then heated to 70° C. and evenly stirred under nitrogen. Subsequently, 48.88 g of bisphenol A epoxy resin monomer (Epoxidized Bisphenol A BE-188, commercially available from Chang Chun Plastics Co., Ltd., hereinafter abbreviated as BE-188) was added to the mixture, then heated to 100° C. and stirred for 1 hour, and then heated to 150° C. to react for further 3.5 hours, thereby obtaining a polymer. HBPA2 and BE-188 had a molar ratio of 1.20. The reaction is shown below:

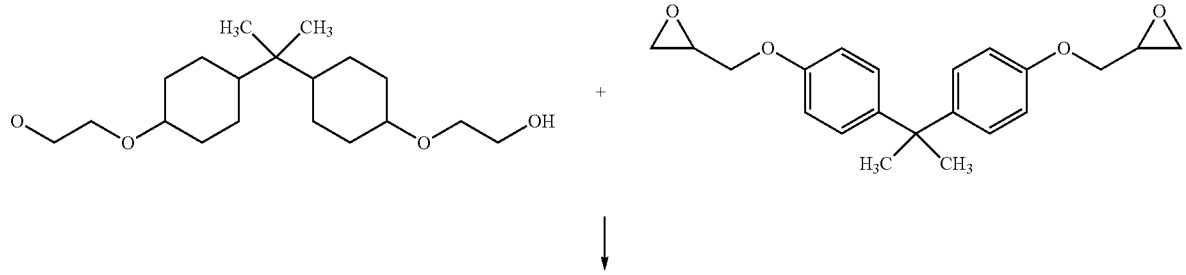

-continued

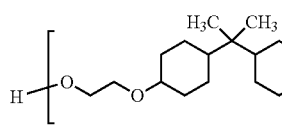 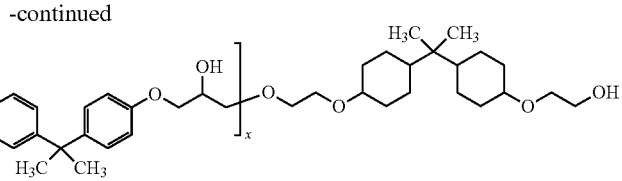

The reaction result was cooled to a temperature lower than 80° C. 25.00 g of xylene was added to the reaction result, and continuously stirred to lower the temperature, thereby obtaining a coating material base including the polymer with a high solid content. The polymer had a weight average molecular weight (Mw) of 6243 g/mole (measured by the standard ASTM D5296), a hydroxyl equivalent weight of 292.7 g/eq (measured by the standard ASTM D4274), a hydroxyl value (OHV) of 154.2 mgKOH/g (measured by the standard ASTM D4274), an acid value of 37.5 mgKOH/g (measured by the standard ASTM D974), and epoxide equivalent weight (EEW) of 2430 g/eq (measured by the standard ASTM D1652 or CNS 13067). When the solid content of the polymer in the coating material base was 60%, the coating material base had a viscosity of 534 cps at 25° C. (measured by the standard ASTM D445 or CNS 9725).

Example 2

63.59 g of HBPA2 and 0.40 g of BF3-MEA were mixed, and then heated to 70° C. and evenly stirred under nitrogen. Subsequently, 36.43 g of BE-188 was added to the mixture, then heated to 100° C. and stirred for 1 hour, and then heated to 150° C. to react for further 3.5 hours, thereby obtaining a polymer. HBPA2 and BE-188 had a molar ratio of 2.01. The reaction can be referred to the reaction formula in Example 1, and the difference in Example 2 was the ratio of the HBPA2 and BE-188. The reaction result was cooled to a temperature lower than 80° C. 25.00 g of xylene was added to the reaction result, and continuously stirred to lower the temperature, thereby obtaining a coating material base including the polymer with a high solid content. The polymer had a Mw of 1961 g/mole (measured by the standard ASTM D5296), a hydroxyl equivalent weight of 226.2 g/eq (measured by the standard ASTM D4274), a hydroxyl value (OHV) of 212.6 mgKOH/g (measured by the standard ASTM D4274), an acid value of 35.5 mgKOH/g (measured by the standard ASTM D974), and epoxide equivalent weight (EEW) of 5950 g/eq (measured by the standard ASTM D1652 or CNS 13067). When the solid content of the polymer in the coating material base was 80%, the coating material base had a viscosity of 3194 cps at 25° C. (measured by the standard ASTM D445 or CNS 9725). When the solid content of the polymer in the coating material base was 60%, the coating material base had a viscosity of 161 cps at 25° C. (measured by the standard ASTM D445 or CNS 9725).

Example 3

81.50 g of HBPA2 and 0.40 g of BF3-MEA were mixed, and then heated to 70° C. and evenly stirred under nitrogen. Subsequently, 18.52 g of BE-188 was added to the mixture, then heated to 100° C. and stirred for 1 hour, and then heated to 150° C. to react for further 3.5 hours, thereby obtaining a polymer. HBPA2 and BE-188 had a molar ratio of 5.04. The reaction can be referred to the reaction formula in Example 1, and the difference in Example 3 was the ratio of the HBPA2 and BE-188. The reaction result was cooled to a temperature lower than 80° C. 25.00 g of xylene was added to the reaction result, and continuously stirred to lower the temperature, thereby obtaining a coating material base including the polymer with a high solid content. The polymer had a Mw of 777 g/mole (measured by the standard ASTM D5296), a hydroxyl equivalent weight of 236.3 g/eq (measured by the standard ASTM D4274), a hydroxyl value (OHV) of 230.1 mgKOH/g (measured by the standard ASTM D4274), an acid value of 7.4 mgKOH/g (measured by the standard ASTM D974), and epoxide equivalent weight (EEW) of 12520 g/eq (measured by the standard ASTM D1652 or CNS 13067). When the solid content of the polymer in the coating material base was 80%, the coating material base had a viscosity of 3267 cps at 25° C. (measured by the standard ASTM D445 or CNS 9725). When the solid content of the polymer in the coating material base was 60%, the coating material base had a viscosity of 90 cps at 25° C. (measured by the standard ASTM D445 or CNS 9725).

Example 4

62.20 g of HBPA2 and 0.40 g of BF3-MEA were mixed, and then heated to 70° C. and evenly stirred under nitrogen. Subsequently, 38.41 g of hydrogenated bisphenol A epoxy resin monomer (Epoxidized Hydrogenated Bisphenol A EPALLOY™ 5000, commercially available from CVC Thermoset Specialties, hereinafter abbreviated as HBE-188) was added to the mixture, then heated to 100° C. and stirred for 1 hour, and then heated to 150° C. to react for further 3.5 hours, thereby obtaining a polymer. HBPA2 and HBE-188 had a molar ratio of 2.00. The reaction is shown below:

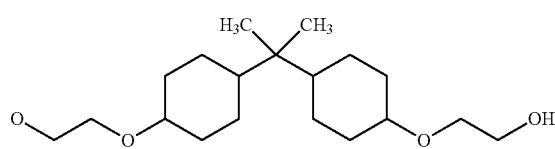 + 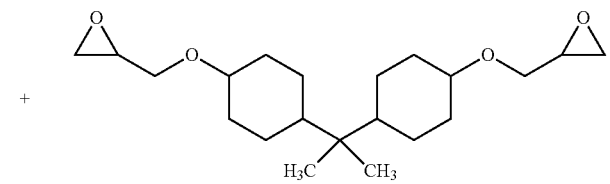

↓

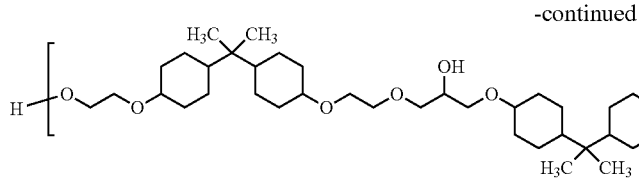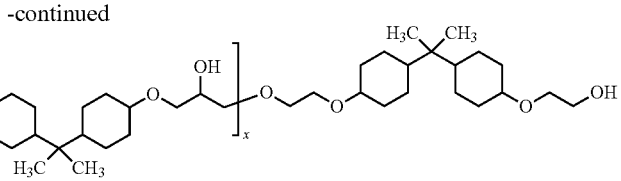

The reaction result was cooled to a temperature lower than 80° C. 25.00 g of xylene was added to the reaction result, and continuously stirred to lower the temperature, thereby obtaining a coating material base including the polymer with a high solid content. The polymer had a Mw of 1817 g/mole (measured by the standard ASTM D5296), a hydroxyl equivalent weight of 275.5 g/eq (measured by the standard ASTM D4274), a hydroxyl value (OHV) of 190.4 mgKOH/g (measured by the standard ASTM D4274), an acid value of 13.3 mgKOH/g (measured by the standard ASTM D974), and epoxide equivalent weight (EEW) of 6575 g/eq (measured by the standard ASTM D1652 or CNS 13067). When the solid content of the polymer in the coating material base was 80%, the coating material base had a viscosity of 2038 cps at 25° C. (measured by the standard ASTM D445 or CNS 9725). When the solid content of the polymer in the coating material base was 60%, the coating material base had a viscosity of 95 cps at 25° C. (measured by the standard ASTM D445 or CNS 9725).

Example 5

80.00 g of HBPA2 and 0.40 g of BF3-MEA were mixed, and then heated to 70° C. and evenly stirred under nitrogen. Subsequently, 20.00 g of HBE-188 was added to the mixture, then heated to 100° C. and stirred for 1 hour, and then heated to 150° C. to react for further 3.5 hours, thereby obtaining a polymer. HBPA2 and HBE-188 had a molar ratio of 5.37. The reaction can be referred to the reaction formula in Example 4, and the difference in Example 5 was the ratio of the HBPA2 and HBE-188. The reaction result was cooled to a temperature lower than 80° C. 25.00 g of xylene was added to the reaction result, and continuously stirred to lower the temperature, thereby obtaining a coating material base including the polymer with a high solid content. The polymer had a Mw of 661 g/mole (measured by the standard ASTM D5296), a hydroxyl equivalent weight of 215.4 g/eq (measured by the standard ASTM D4274), a hydroxyl value (OHV) of 219.1 mgKOH/g (measured by the standard ASTM D4274), an acid value of 4.1 mgKOH/g (measured by the standard ASTM D974), and epoxide equivalent weight (EEW) of 11960 g/eq (measured by the standard ASTM D1652 or CNS 13067). When the solid content of the polymer in the coating material base was 80%, the coating material base had a viscosity of 2421 cps at 25° C. (measured by the standard ASTM D445 or CNS 9725). When the solid content of the polymer in the coating material base was 60%, the coating material base had a viscosity of 88 cps at 25° C. (measured by the standard ASTM D445 or CNS 9725).

Comparative Example 1

Polymer resin 3068s (Mw>6000, measured by the standard ASTM D5296, commercially available from EVERCOLORFUL Coating Research/Tech. Center) served as a coating material base. When the solid content of the polymer in the coating material base was 35%, the coating material base had a viscosity of 110 cps at 25° C. (measured by the standard ASTM D445 or CNS 9725).

Comparative Example 2

Polymer resin CM-1006 (Mw>6000, measured by the standard ASTM D5296, commercially available from EVERCOLORFUL Coating Research/Tech. Center) served as a coating material base. When the solid content of the polymer in the coating material base was 43%, the coating material base had a viscosity of 179 cps at 25° C. (measured by the standard ASTM D445 or CNS 9725).

Comparative Example 3

Polymer resin EVC-380 (Mw>6000, measured by the standard ASTM D5296, commercially available from EVERCOLORFUL Coating Research/Tech. Center) served as a coating material base. When the solid content of the polymer in the coating material base was 50%, the coating material base had a viscosity of 528 cps at 25° C. (measured by the standard ASTM D445 or CNS 9725). As shown in Examples 1 to 5 and Comparative Examples 1 to 3, the coating material base having a solid content of about 50% in Comparative Examples had a viscosity similar to or greater than that of the coating material base having a solid content of about 60% in Examples.

Example 6

11.97 g of the curing agent (multi-isocyanate compound Desmodur® N75BA, commercially available from COVESTRO) was added to 10 g of the coating material base (solid content=80%) prepared in Example 2, and then mixed and coated to form a film. The film was dried at room temperature for 7 days to form a coating layer, which had brightness of 93 (measured by the standard ASTM D523 or CNS 10756-1). Desmodur® N75BA had a chemical structure of

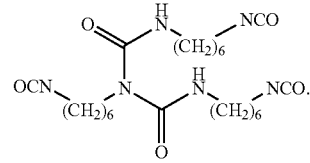

Example 7

8.99 g of the curing agent Desmodur® N75BA was added to 10 g of the coating material base (solid content=60%) prepared in Example 2, and then mixed and coated to form a film. The film was dried at room temperature for 7 days to form a coating layer, which had brightness of 93 (measured by the standard ASTM D523 or CNS 10756-1).

Example 8

12.09 g of the curing agent Desmodur® N75BA was added to 10 g of the coating material base (solid content=80%) prepared in Example 3, and then mixed and coated to form a film. The film was dried at room temperature for 7 days to form a coating layer, which had brightness of 94 (measured by the standard ASTM D523 or CNS 10756-1).

Example 9

9.06 g of the curing agent Desmodur® N75BA was added to 10 g of the coating material base (solid content=60%) prepared in Example 3, and then mixed and coated to form a film. The film was dried at room temperature for 7 days to form a coating layer, which had brightness of 96 (measured by the standard ASTM D523 or CNS 10756-1).

Example 10

11.21 g of the curing agent Desmodur® N75BA was added to 10 g of the coating material base (solid content=80%) prepared in Example 5, and then mixed and coated to form a film. The film was dried at room temperature for 7 days to form a coating layer, which had brightness of 93 (measured by the standard ASTM D523 or CNS 10756-1).

Example 11

8.41 g of the curing agent Desmodur® N75BA was added to 10 g of the coating material base (solid content=60%) prepared in Example 5, and then mixed and coated to form a film. The film was dried at room temperature for 7 days to form a coating layer, which had brightness of 95 (measured by the standard ASTM D523 or CNS 10756-1).

Comparative Example 4

4.00 g of curing agent DI-44702 (commercially available from EVERCOLORFUL Coating Research/Tech. Center) was added to 12.00 g of the coating material base (solid content=35%) in Comparative Example 1, and then mixed and coated to form a film. The film was dried at room temperature for 7 days to form a coating layer, which had brightness of 96 (measured by the standard ASTM D523 or CNS 10756-1).

Comparative Example 5

4.00 g of the curing agent DI-44702 (commercially available from EVERCOLORFUL Coating Research/Tech. Center) was added to 12.00 g of the coating material base (solid content=43%) in Comparative Example 2, and then mixed and coated to form a film. The film was dried at room temperature for 7 days to form a coating layer, which had brightness of 97 (measured by the standard ASTM D523 or CNS 10756-1).

Comparative Example 6

4.00 g of the curing agent DI-44702 (commercially available from EVERCOLORFUL Coating Research/Tech. Center) was added to 12.00 g of the coating material base (solid content=50%) in Comparative Example 3, and then mixed and coated to form a film. The film was dried at room temperature for 7 days to form a coating layer, which had brightness of 97 (measured by the standard ASTM D523 or CNS 10756-1).

As shown in comparison between Examples 6 to 11 and Comparative Examples 4 to 6, the coating material base having high solid content in Examples and the curing agent could be mixed and cured to form a coating layer with high brightness. In other words, the solid content was increased to lower VOC, but the coating film properties (e.g. brightness) would not be sacrificed.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A polymer, being formed by reacting a diol having hydrogenated bisphenol group with a bis-epoxy compound, wherein the bis-epoxy compound comprises

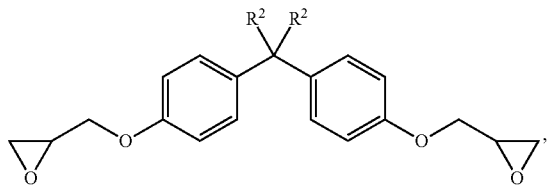

wherein each of $R^2$ is independently H or methyl, wherein the diol having hydrogenated bisphenol group has a chemical structure of:

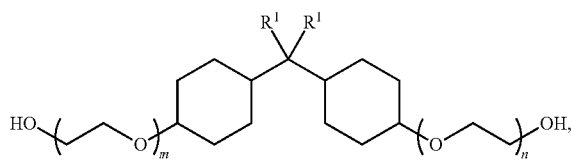

wherein each of $R^1$ is independently H or methyl, and m and n are independently integers of 1 to 4.

2. The polymer as claimed in claim 1, wherein the bis-epoxy compound further comprises

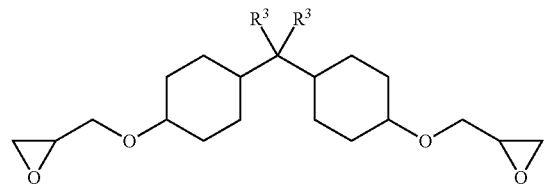

wherein each of $R^3$ is independently H or methyl.

3. The polymer as claimed in claim 1, wherein the diol having hydrogenated bisphenol group with a bis-epoxy compound have a molar ratio of 1:1 to 7:1.

4. The polymer as claimed in claim 1, having a weight average molecular weight of 600 to 6500.

5. A polymer, having a chemical structure of:

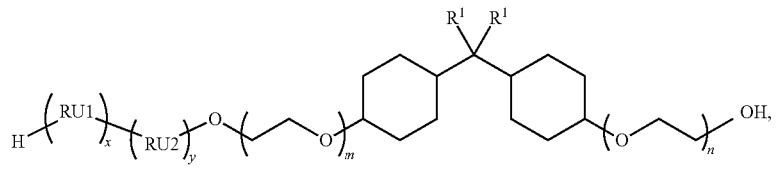

wherein RU1 has a chemical structure of

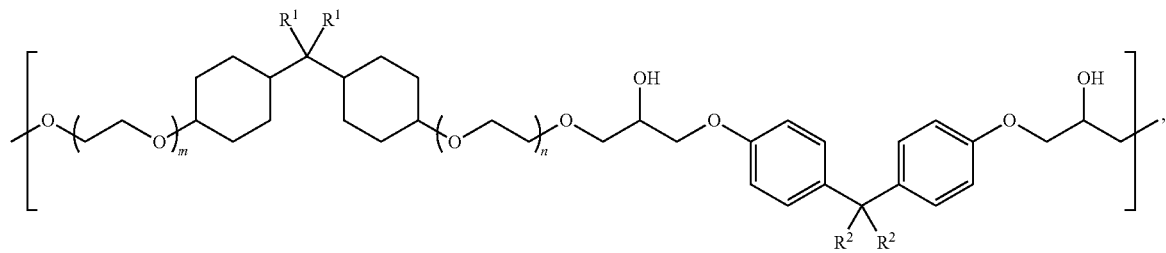

RU2 has a chemical structure of

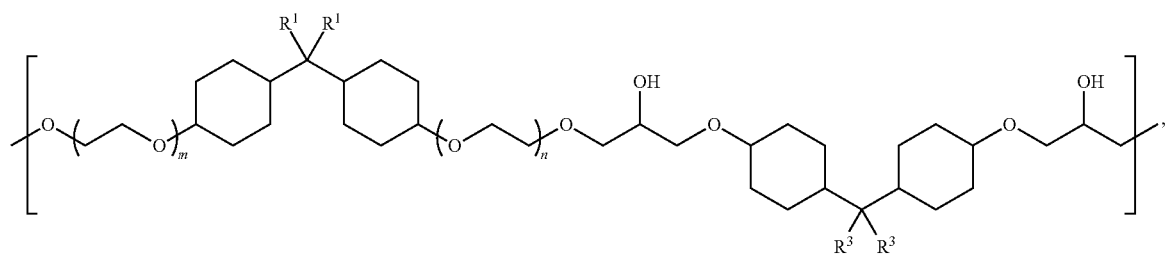

wherein each of $R^1$ is independently H or methyl, each of $R^2$ is independently H or methyl, each of $R^3$ is independently H or methyl, m and n are independently integers of 1 to 4, x is an integer of 1 to 9, and y is an integer of 0 to 9.

6. The polymer as claimed in claim 5, having a weight average molecular weight of 600 to 6500.

7. A coating material, comprising:
100 parts by weight of polymer;
130 to 160 parts by weight of curing agent; and
25 to 70 parts by weight of solvent,
wherein the polymer is formed by reacting a diol having hydrogenated bisphenol group with a bis-epoxy compound,
wherein the polymer has a chemical structure of:

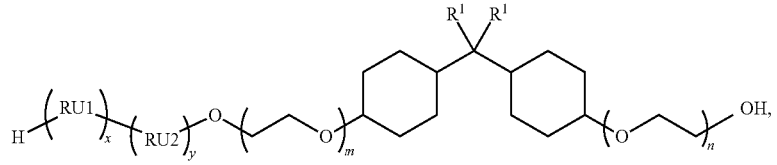

wherein RU1 has a chemical structure of

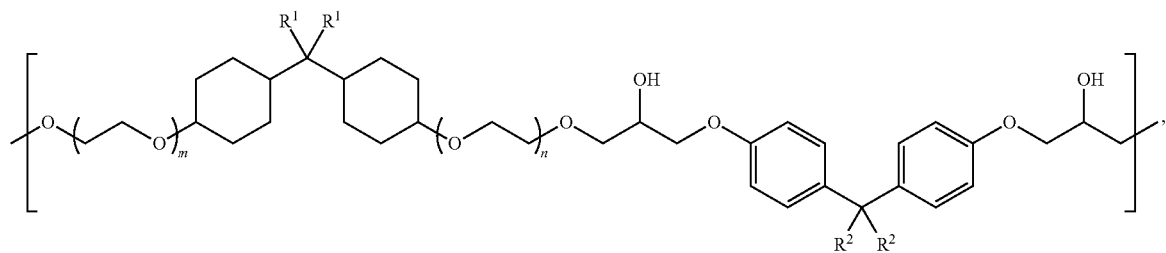

RU2 has a chemical structure of

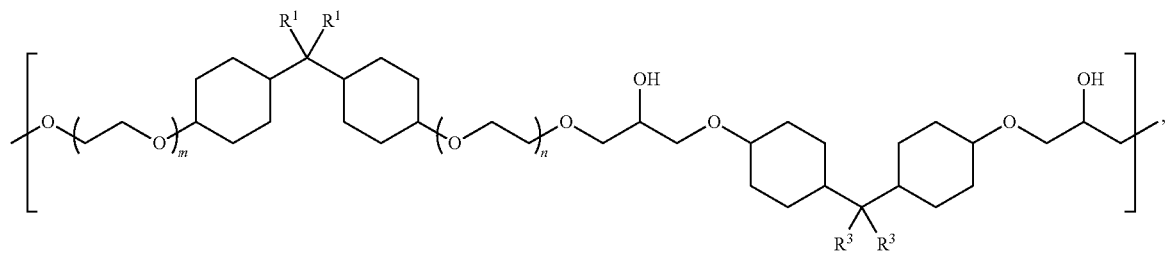

wherein each of $R^1$ is independently H or methyl, each of $R^2$ is independently H or methyl, each of $R^3$ is independently H or methyl, m and n are independently integers of 1 to 4, x and y are independently integers of 0 to 9, and x+y≠0.

8. The coating material as claimed in claim 7, wherein the diol having hydrogenated bisphenol group has a chemical structure of:

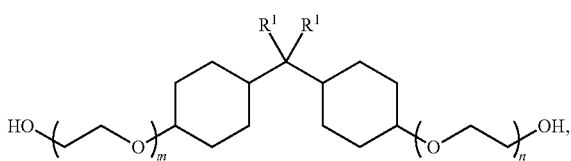

wherein each of $R^1$ is independently H or methyl, and m and n are independently integers of 1 to 4.

9. The coating material as claimed in claim 7, wherein the bis-epoxy compound is

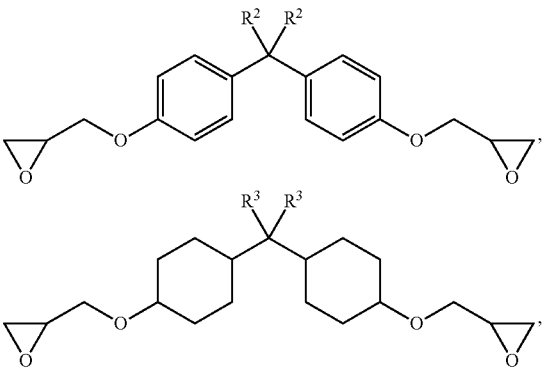

or a combination thereof, wherein each of $R^2$ is independently H or methyl, and each of $R^3$ is independently H or methyl.

10. The coating material as claimed in claim 7, wherein the diol having hydrogenated bisphenol group with a bis-epoxy compound have a molar ratio of 1:1 to 7:1.

11. The coating material as claimed in claim 7, wherein the polymer has a weight average molecular weight of 600 to 6500.

* * * * *